UNITED STATES PATENT OFFICE.

WILLIAM WRIGHT, OF NEW YORK, N. Y., ASSIGNOR TO THE WRIGHT'S DENVER AND SAN FRANCISCO ELECTRIC LIGHT COMPANY, OF COLORADO.

BATTERY COMPOUND.

SPECIFICATION forming part of Letters Patent No. 446,544, dated February 17, 1891.

Application filed May 12, 1890. Serial No. 351,528. (No specimens.)

*To all whom it may concern:*

Be it known that I, WILLIAM WRIGHT, a citizen of the United States, and a resident of New York, county and State of New York, have invented a certain new and useful Battery Compound, of which the following is a specification.

The object of my invention is to provide an electrolyte for primary and other batteries, whereby electro-motive force of any desired intensity may be secured at a lower cost than has hitherto been attained.

By experiments and exhaustive tests I have ascertained that battery compounds and solutions containing aluminium are admirably adapted to serve as an economical source of electricity when used in connection with the positive and negative elements—as carbon and zinc—of a primary or other battery, such compounds and solutions producing a current of far greater energy and constancy than I have been able to secure with any of the electrolytes heretofore used, and that, too, at a greatly reduced expense.

My compound is designed for use in galvanic batteries of either the single-solution or porous-cup varieties, and may also be used in that style ordinarily designated as the "dry battery."

A variety of different compounds and solutions having aluminium for a base can be made, according to the manner in which the aluminium is treated, which electrolytes will be efficient in practical use to provide a current of great electro-motive force and durability.

One very good aluminium compound may be made as follows, namely: I heat a salt of aluminium in water until it becomes a glutinous mass and then add sulphuric acid and afterward bichromate of soda, the proportion of parts being: aluminium, ten ounces; water, ten ounces; sulphuric acid, fifteen ounces; bichromate of soda, twenty ounces. After the bichromate of soda is fully dissolved fifteen ounces more of sulphuric acid may be added, the whole being thoroughly mixed by any convenient means or method, whereupon the resultant compound, which is practically a dry product, will be found to be an admirable electrolyte.

In cases where the compound is required in the form of a solution it may be readily dissolved in water.

As stated above, variations may be made in the exciting or oxygenated materials used in connection with my aluminium base for different requirements. For example, I sometimes use bichromate of potash in connection with aluminium in preparing some battery compounds. Again, in other cases I use sulphate of soda, together with bichromate of soda, as ingredients with the same in making my aluminium electrolyte, which may consist of aluminium used in connection with any suitable acids or salts, according to the description of battery used and the kind of work to be performed.

Although I prefer for convenience for purposes of storage, handling, and transportation to use aluminium compounds in the form of a dry product, yet aluminium electrolytes may equally well be kept in a state of solution. In cases where the compound is used as a dry product it may be supplied either in the form of cakes or blocks or powder, thereby being very conveniently handled or conveyed to the places where the electrolyte is required, and in order to use it it is simply placed in the bottom of the cells or elements, which are then filled up with pure water, more or less of the compound being used, according to the energy of the current desired.

With electrolytes prepared with aluminium for a base, on account of the low cost and durable nature of the same and the high electro-motive force and constancy of the current obtained, batteries may be caused to produce electric energy at a far lower cost than has hitherto been possible.

What I claim as new, and desire to secure by Letters Patent, is—

1. As a new product for charging batteries, an electrolyte containing a salt of aluminium or other aluminium compound treated with sulphuric acid and bichromate of soda, substantially as described.

2. The combination of positive and negative battery elements with an electrolyte containing a salt of aluminium or other aluminium compound used in connection with bichromate of soda, substantially as described.

In testimony of the foregoing specification I do hereby sign the same, in the city of New York, county and State of New York, this 9th day of May, A. D. 1890.

WILLIAM WRIGHT.

Witnesses:
J. ODELL FOWLER, Jr.,
WM. M. V. FOWLER.